United States Patent
Kajiwara et al.

(10) Patent No.: US 8,920,982 B2
(45) Date of Patent: Dec. 30, 2014

(54) GAS DETECTION SYSTEM, FUEL CELL SYSTEM, AND VEHICLE

(75) Inventors: Shigeto Kajiwara, Okazaki (JP); Katsuki Ishigaki, Handa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 394 days.

(21) Appl. No.: 12/738,263

(22) PCT Filed: Oct. 2, 2008

(86) PCT No.: PCT/JP2008/068317
§ 371 (c)(1),
(2), (4) Date: Apr. 15, 2010

(87) PCT Pub. No.: WO2009/051049
PCT Pub. Date: Apr. 23, 2009

(65) Prior Publication Data
US 2010/0209787 A1 Aug. 19, 2010

(30) Foreign Application Priority Data
Oct. 17, 2007 (JP) .................... 2007-270270

(51) Int. Cl.
*H01M 8/00* (2006.01)
*H01M 8/04* (2006.01)
*H01M 8/10* (2006.01)

(52) U.S. Cl.
CPC ............ *H01M 8/04679* (2013.01); *Y02E 60/50* (2013.01); *H01M 8/04447* (2013.01); *H01M 2008/1095* (2013.01); *Y02T 90/32* (2013.01); *H01M 2250/20* (2013.01)
USPC ........... 429/400; 429/401; 429/402; 429/408; 429/411; 429/427; 429/428; 429/429; 429/443; 429/444; 429/448; 429/449; 429/502; 429/505; 429/90; 429/91; 429/200

(58) Field of Classification Search
USPC ........... 429/400, 57, 427, 402, 403, 407, 412, 429/413, 426, 428, 90, 535
See application file for complete search history.

(56) References Cited

U.S. PATENT DOCUMENTS

| | | | |
|---|---|---|---|
| 6,519,041 B1 * | 2/2003 | Berthold | 356/477 |
| 2003/0008185 A1 * | 1/2003 | Sugino et al. | 429/13 |
| 2005/0284208 A1 * | 12/2005 | Oishi et al. | 73/23.2 |
| 2007/0028666 A1 * | 2/2007 | Sasaki et al. | 73/23.21 |
| 2008/0208403 A1 * | 8/2008 | Bertosa et al. | 701/29 |

FOREIGN PATENT DOCUMENTS

| | | |
|---|---|---|
| DE | 43 41 437 C1 | 1/1995 |
| JP | 7-94991 B2 | 10/1995 |
| JP | 11-306463 A | 11/1999 |
| JP | 2000-099856 A | 4/2000 |
| JP | 2004-179024 A | 6/2004 |
| JP | 2006-010622 A | 1/2006 |
| JP | 2006-011922 A | 1/2006 |
| JP | 2006-019035 A | 1/2006 |
| JP | 2007-046916 A | 2/2007 |
| JP | 2007-066643 A | 3/2007 |

* cited by examiner

*Primary Examiner* — Jeffrey Wollschlager
*Assistant Examiner* — Stella Yi
(74) *Attorney, Agent, or Firm* — Kenyon & Kenyon LLP

(57) ABSTRACT

A gas detection system is configured to detect a preset gas in a predetermined space. The gas detection system includes a gas concentration detector constructed to detect a gas concentration of the preset gas, a recording assembly, a notification module, and a decision module. When the gas concentration detected by the gas concentration detector is higher than a preset first reference value, the decision module controls the notification module to give notice. When the detected gas concentration is higher than a preset second reference value but is lower than the preset first reference value, on the other hand, the decision module controls the notification module to give no notice but record a specific piece of information into the recording assembly. This arrangement of the gas detection system enables the user to readily detect deterioration of a device utilizing a fuel, for example, fuel cells.

4 Claims, 3 Drawing Sheets

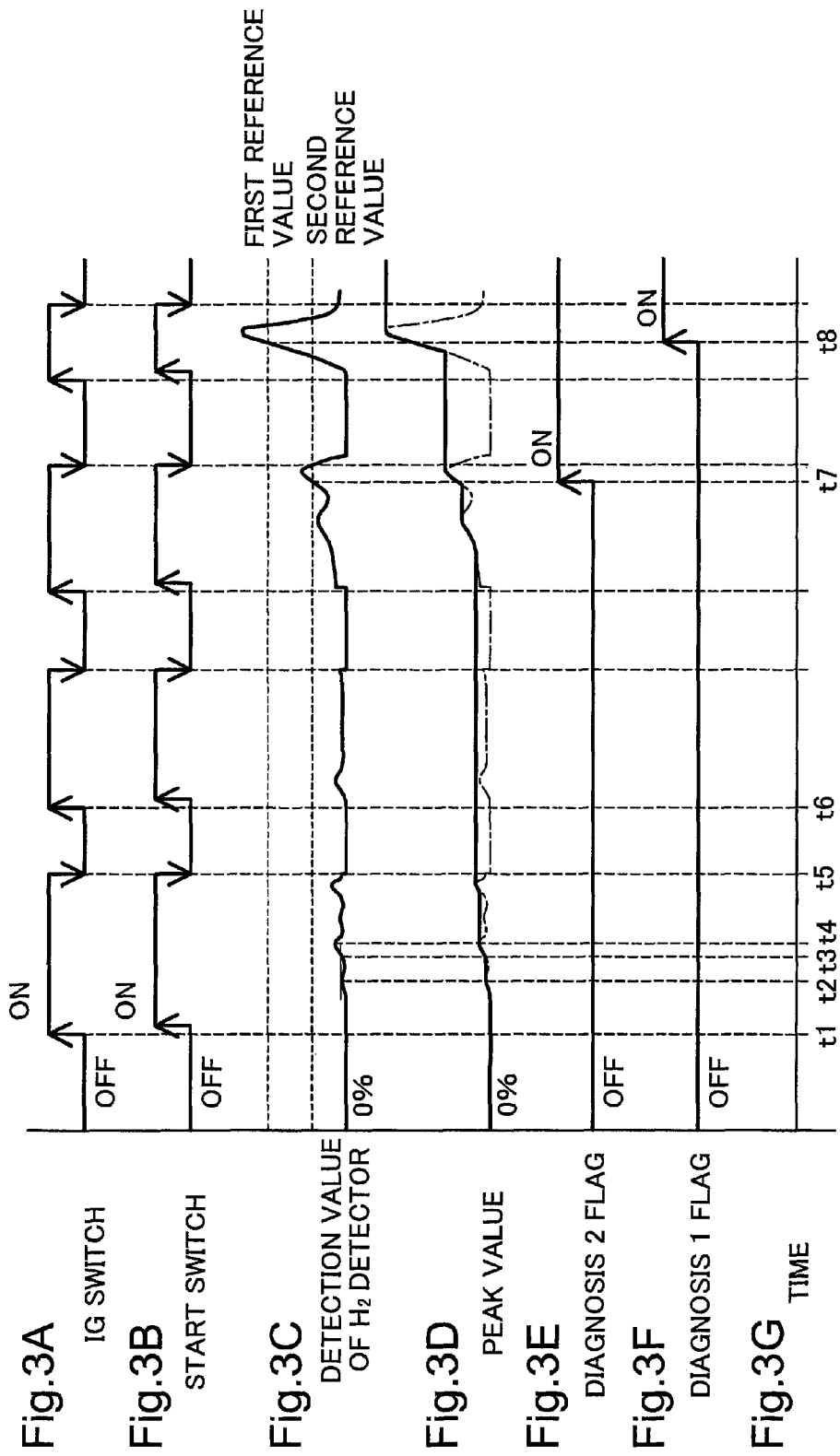

GAS DETECTION SYSTEM, FUEL CELL SYSTEM, AND VEHICLE

This is a 371 national phase application of PCT/JP2008/068317 filed 2 Oct. 2008, which claims priority of Japanese Patent Application No. 2007-270270 filed 17 Oct. 2007, the contents of which are incorporated herein by reference.

TECHNICAL FIELD

The present invention relates to a gas detection system.

BACKGROUND ART

Fuel cells utilizing a hydrogen-containing fuel gas to generate electric power are typically arranged to have a stack structure obtained by stacking multiple power generation assemblies via separators (hereafter this may be referred to as 'fuel cell stack'). Repetition of starting and stopping the operation of the fuel cell stack may cause some defect or flaw in a sealing member located between the power generation assembly and the adjacent separator or may cause distortion of the fuel cell stack, which results in producing a gap between the power generation assembly and the adjacent separator. A fuel gas may be leaked from the defect or the flaw or from the gap.

Sensor-based gas detection is conventionally adopted in fuel cell systems including such fuel cells (see, for example, Japanese Patent Laid-Open No. 2007-46916, No. 2004-179024, No. 2006-19035, and No. 2007-66643).

Detecting deterioration of a fuel cell stack generally requires much time and labor, for example, disassembly prior to a checkup. Especially in a vehicle equipped with fuel cells, it is highly demanded to check the level of deterioration of the fuel cells, which are neither detached from the vehicle nor disassembled but are kept on the vehicle.

This demand is not restricted to detection of a leakage of a fuel gas from the fuel cells but is commonly found in, for example, detecting a leakage of a fuel from any of a gasoline engine, a diesel engine, a hydrogen engine, and a natural gas engine, as well as detecting a leakage of a fuel from production equipment used for manufacturing and accumulating the fuel.

DISCLOSURE OF THE INVENTION

With a view to fulfilling at least part of the demand discussed above, it would be required to provide a technique of enabling the user to readily detect deterioration of a device utilizing a fuel, for example, fuel cells.

In order to accomplish at least part of the requirement mentioned above and the other relevant requirements, a first aspect of the invention is directed to a gas detection system configured to detect a preset gas in a predetermined space. The gas detection system includes a gas concentration detector constructed to detect a gas concentration of the preset gas, a recording assembly, a notification module, and a decision module. When the gas concentration detected by the gas concentration detector is higher than a preset first reference value, the decision module controls the notification module to give notice. When the detected gas concentration is higher than a preset second reference value but is lower than the preset first reference value, on the other hand, the decision module controls the notification module to give no notice but record a specific piece of information into the recording assembly.

When a detection value representing the gas concentration detected by the gas concentration detector is greater than the preset first reference value, the gas detection system according to this aspect of the invention gives notice to the user. When the detection value is smaller than the preset first reference value but is greater than the preset second reference value, on the other hand, the gas detection system according to this aspect of the invention does not give notice to the user but simply records the specified piece of information, for example, a specific code representing the detection value of greater than the second reference value. The gas detection system of the invention may be used in combination with a device utilizing a fuel. In the event of a rather insignificant gas leakage that is not a user alarming level from the fuel-utilizing device, the gas detection system simply records a piece of information representing the insignificant gas leakage. On the occasion of subsequent checkup and maintenance of the fuel-utilizing device, the checker can readily detect deterioration of the fuel-utilizing device, based on the recorded piece of information.

The preset gas may be any of diverse gases, for example, hydrogen, methanol, or gasoline. At a checkup time for a fuel leakage from an engine mounted on a vehicle, for example, the gas concentration detector may be designed to detect the concentration of a fuel gas in an engine compartment defined as the predetermined space. At a checkup time for a hydrogen leakage from fuel cells, the gas concentration detector may be designed to detect the concentration of hydrogen in a fuel cell casing defined as the predetermined space. At a checkup time for a gas leakage from production equipment used for manufacturing and accumulating hydrogen gas, the gas concentration detector may be designed to detect the concentration of the gas in the predetermined space with the production equipment installed therein.

The principle of the present invention is actualized by diversity of applications, for example, the gas detection system discussed above, a fuel cell system including such a gas detection system, a vehicle equipped with such a gas detection system, a vehicle equipped with a fuel cell system including such a gas detection system, and a gas detection method.

BRIEF DESCRIPTION OF THE DRAWINGS

FIG. 3 is a time chart showing a variation in detection value by a hydrogen detector 10, together with ON-OFF timings of respective switches included in the fuel cell system 200 and ON-OFF settings of respective diagnosis flags.

BEST MODES OF CARRYING OUT THE INVENTION

Some modes of carrying out the invention are discussed below in the following sequence with reference to the accompanied drawings:
A. Embodiment
B. Other Aspects

A. Embodiment

Figure 1:
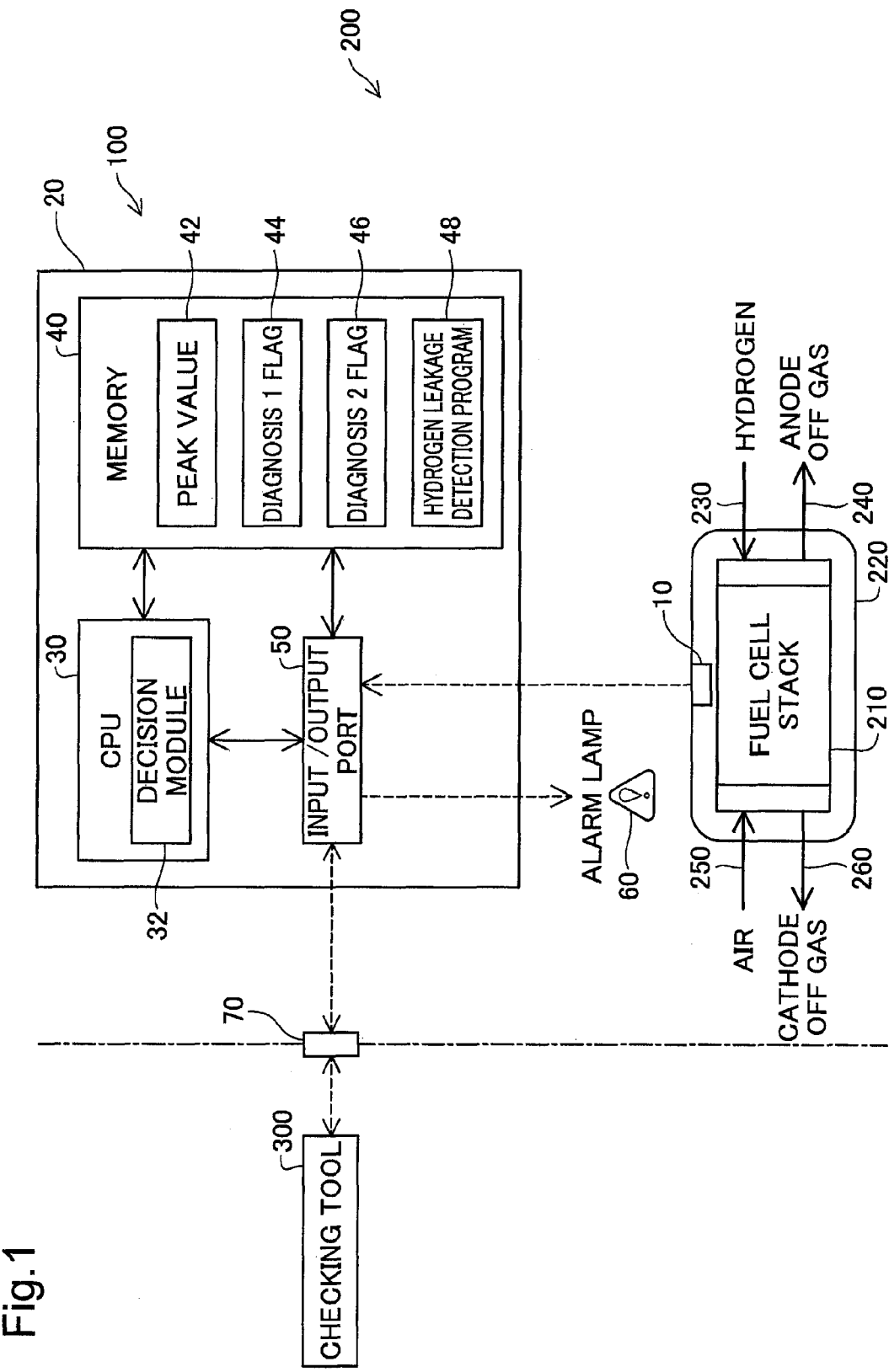
FIG. 1 is an explanatory view schematically illustrating the configuration of a fuel cell system 200 in accordance with one embodiment of the invention.

FIG. 1 is an explanatory view schematically illustrating the configuration of a fuel cell system 200 in accordance with one embodiment of the invention. The fuel cell system 200 of this embodiment includes a hydrogen detection system 100 and is mounted on a fuel cell vehicle (not shown).

A1. Configuration of Fuel Cell System

The fuel cell system 200 includes a fuel cell stack 210, a hydrogen supply system arranged to supply hydrogen as a fuel gas, an air supply-discharge system arranged to supply and discharge the air as an oxidation gas, a cooling water circulation system arranged to cool down the fuel cell stack 210, and the hydrogen detection system 100 as main components. In this embodiment, the fuel cell stack 210 is constructed as a stack of polymer electrolyte fuel cells and is located in a fuel cell casing 220. The fuel cell casing 220 is designed to have gas permeability, which enables hydrogen included in the fuel cell casing 200 to be expelled from the fuel cell casing 220. A hydrogen detector 10 included in the hydrogen detection system 100 (discussed later) is installed in the internal space of the fuel cell casing 220.

In the hydrogen supply system, a supply of hydrogen is introduced from a hydrogen tank (not shown) provided for storage of high-pressure hydrogen into anodes of the fuel cell stack 210 via a flow path 230. In the air supply-discharge system, a supply of the air compressed by a compressor (not shown) is introduced into cathodes in the fuel cell stack 210 via a flow path 250. Exhaust gases of the hydrogen and the air used for electrochemical reactions proceeding on the respective electrodes are discharged respectively as an anode off gas through a flow path 240 and as a cathode off gas through a flow path 260 and are released to the atmosphere. For recycle of non-reacted hydrogen, the anode off gas may be returned to the flow path 230 after removal of the water content, nitrogen, and other impurities. The hydrogen detection system 100 is discussed below in detail.

A2. Structure of Hydrogen Detection System

The hydrogen detection system 100 includes a hydrogen detector 10, an ECU (electronic control unit) 20, an alarm lamp 60, and input/output terminals 70 as primary components. The hydrogen detector 10 in the embodiment is equivalent to the gas concentration detector in the claims of the invention.

The hydrogen detector 10 is installed in the fuel cell casing 220 as shown in FIG. 1 and functions to detect the hydrogen concentration in the fuel cell casing 220 at preset time intervals and send each detected hydrogen concentration as a detection value to the ECU 20. The alarm lamp 60 is located on an instrument panel (not shown) in the fuel cell vehicle and is lit up in response to a command from the ECU 20. The input/output terminals 70 are located in the instrument panel. A checking tool 300 is connectable to the input/output terminals 70. In the state of connection of the checking tool 300, signals are transmittable between the ECU 20 and the checking tool 300 via the input/output terminals 70. The checking tool 300 may be, for example, a fault diagnosis device used for checking and servicing in automobile dealers.

As illustrated, the ECU 20 includes a CPU 30, a memory 40, and an input/output port 50. A peak value 42 (initial setting=0) representing a current maximum of the detection value of the hydrogen detector 10, a diagnosis 1 flag 44 (initial setting=OFF), a diagnosis 2 flag 46 (initial setting=OFF), and a hydrogen leakage detection program 48 are recorded in advance in the memory 40. Here the term 'diagnosis' represents a 'diagnosis code'. The CPU 30 sets each of the diagnosis 1 flag and the diagnosis 2 flag to ON or OFF, based on the detection value of the hydrogen detector 10 as discussed later.

The CPU 30 performs the hydrogen leakage detection program 48 recorded in the memory 40 to function as a decision module 32. The decision module 32 receives the hydrogen concentration detected by the hydrogen detector 10 as each detection value via the input/output port 50 and records a current maximum of the detection value as the peak value 42 into the memory 40.

The decision module 32 determines whether each detection value of the hydrogen detector 10 is greater than a preset first reference value and whether the detection value of the hydrogen detector 10 is greater than a preset second reference value. The first reference value is set to a relatively high value, for the purpose of detecting the occurrence of a significant hydrogen leakage that is a level of adversely affecting the normal operation of the fuel cell system 200 (a high concentration of hydrogen leakage that may cause a risk in continuous operation of the fuel cell system 200). The second reference value is set to a lower value than the first reference value, for the purpose of detecting the occurrence of a rather insignificant hydrogen leakage that is a level of having no substantive effect on the normal operation of the fuel cell system 200. The decision module 32 specifies the ON/OFF settings of the diagnosis 1 flag and the diagnosis 2 flag recorded in the memory 40 and lights up the alarm lamp 60, based on the results of such determination.

In the state of connection of the checking tool 300 to the input/output terminal 70, in response to reception of an output request from the checking tool 300 via the input/output port 50, the decision module 32 sends back the settings of the peak value 42, the diagnosis 1 flag, and the diagnosis 2 flag recorded in the memory 40 to the checking tool 300 via the input/output port 50.

The input/output port 50 receives a detection signal of hydrogen concentration from the hydrogen detector 10 and an output request from the checking tool 300, while sending a light-up command to the alarm lamp 60 and the settings of the diagnosis 1 flag, the diagnosis 2 flag, and the peak value 42 as mentioned previously.

The ECU 20, the alarm lamp 60, and the input/output terminals 70 may be designed exclusively for the hydrogen detection system 100 or may be designed to have some additional functions. For example, a PCU (power control unit) provided for controlling the operations of the fuel cell system 200 may be structured to include the functions of the ECU 20. The alarm lamp 60 may not be exclusively lit up to notify the driver of the occurrence of a hydrogen leakage but may also be lit up to notify the driver of any of various abnormalities or failures, such as a failure of a secondary battery or a failure of the fuel cell stack 210. The input/output terminals 70 may not be exclusively connected to the checking tool for the hydrogen sensor but may also be connectable with various checking tools, such as a checking tool for the secondary battery or a checking tool for the fuel cell stack 210.

A3. Operations of Hydrogen Detection System

Figure 2:
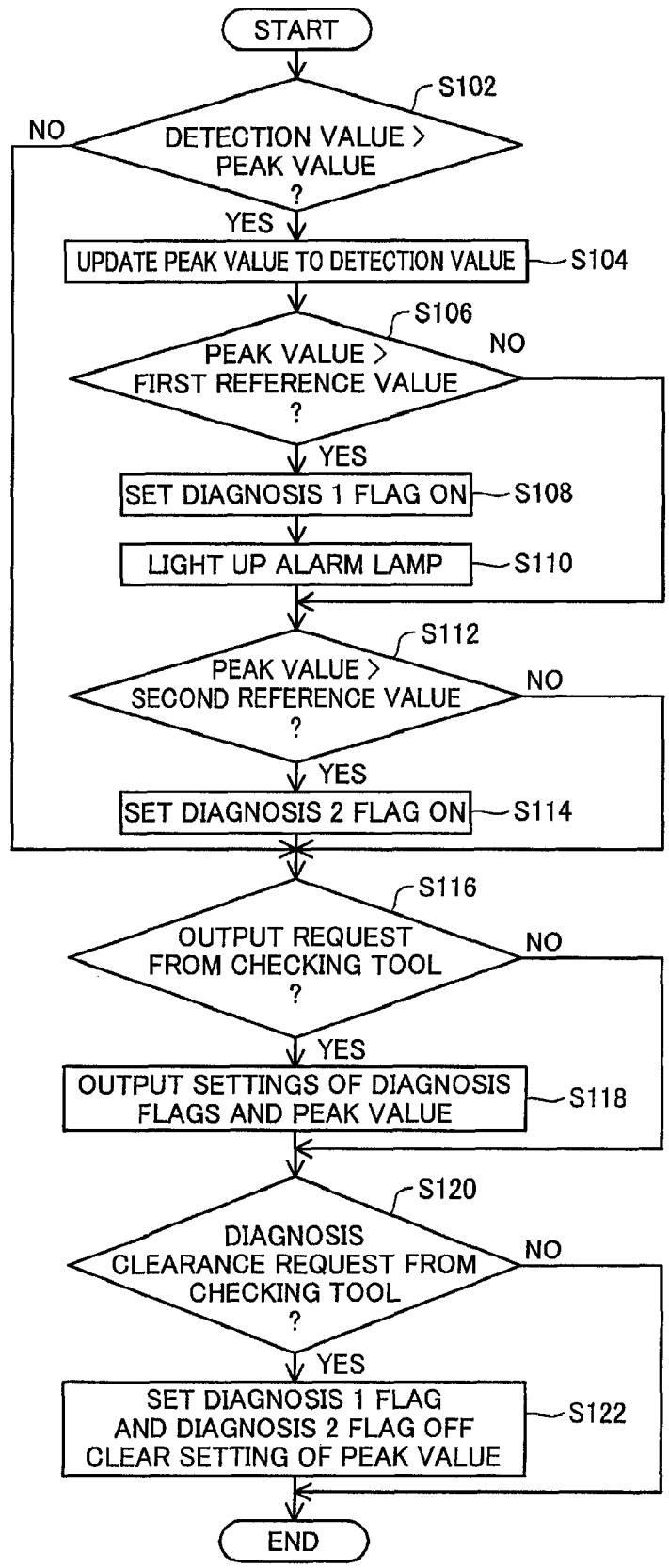
FIG. 2 is a flowchart showing a hydrogen leakage detection process performed by a decision module 32.

FIG. 2 is a flowchart showing a hydrogen leakage detection process performed by the decision module 32. FIG. 3 is a time chart showing a variation in detection value by the hydrogen detector 10, together with the ON-OFF timings of the respective switches included in the fuel cell system 200 and the ON-OFF settings of the respective diagnosis flags.

In the configuration of this embodiment, the fuel cell system 200 is activated by an ON operation of an IG switch and a subsequent ON operation of a start switch. Here the abbreviation 'IG' is short for 'ignition', which originally means ignition of an internal combustion engine. The term 'ignition switch' may thus not be quite suitable for the fuel cell system 200, but has been used for many years in the art as a word meaning a start switch of the vehicle. In view of such background, the term 'IG switch' represents an operator used as a start switch of the vehicle in the specification hereof. In the time chart of FIG. 3, the fuel cell system 200 starts and stops the operation in a repeated manner. The fuel cell system 200 is active under the condition of sequential ON operations of both the IG switch and the start switch.

In this embodiment, at a checkup time of the fuel cell stack 210, the checker connects the checking tool 300 to the input/output terminals 70 via a connection cable to issue an output request. The ECU 20 then outputs the current settings of the respective diagnosis codes and the peak value 42 to be displayed on the checking tool 300.

It is assumed that a hydrogen leakage detection flow discussed below with reference to FIGS. 2 and 3 starts in a state where there is no output request or no diagnosis clearance request from the checking tool 300. In the time chart of FIG. 3, in response to the driver's ON operation of the IG switch at a time t1 (FIG. 3A), the hydrogen detector 10 starts detection of the hydrogen concentration in the fuel cell casing 220 (FIG. 3C). In response to the driver's subsequent ON operation of the start switch (FIG. 3B), the fuel cell stack 210 starts the operation. The hydrogen detector 10 sends the detected hydrogen concentration in the fuel cell casing 220 to the ECU 20 at preset time intervals. The fuel cell casing 220 has the gas permeability as mentioned previously, so that the detected hydrogen concentration in the fuel cell casing 220 varies as shown in FIG. 3C to give peaks of the hydrogen concentration intermittently. The decision module 32 accordingly performs a sequence of processing discussed below to record a current maximum of the detection value as the peak value 42 and detect the occurrence of a hydrogen leakage.

The decision module 32 receives a detection value from the hydrogen detector 10 and determines whether the received detection value is greater than the peak value 42 recorded in the memory 40 (step S102). The peak value 42 is set to 0 as the initial setting. For example, at a time t2 shown in FIG. 3G, the detection value is greater than the initial setting '0' (FIG. 3C), so that the decision module 32 updates the setting of the peak value 42 to the detection value at that time (step S104).

The decision module 32 subsequently determines whether the current setting of the peak value 42 is greater than the first reference value (step S106). Since the current setting of the peak value 42 (=the detection value at the time t2) is smaller than the first reference value as shown in FIG. 3C (step S106: No), the decision module 32 goes to step S112. The decision module 32 determines whether the current setting of the peak value 42 is greater than the second reference value (step S112). Since the current setting of the peak value 42 (=the detection value at the time t2) is smaller than the second reference value as shown in FIG. 3C (step S112: No), the decision module 32 goes to step S116. The decision module 32 identifies whether there is an output request from the checking tool 300 (step S116). There is no output request from the checking tool 300 in this state (step S116: No), so that the decision module 32 goes to step S120 to identify whether there is a diagnosis clearance request from the checking tool 300. There is no diagnosis clearance request from the checking tool 300 in this state. The decision module 32 then terminates the current cycle of the processing flow.

The decision module 32 newly receives a detection value from the hydrogen detector 10 and determines whether the newly received detection value is greater than the peak value 42 recorded in the memory 40 (step S102). The detection value in a time period between the time t2 and a time t3 is smaller than the current setting of the peak value 42 (=the detection value at the time t2). The decision module 32 accordingly determines that the detection value is smaller than the peak value 42 (step S102: No) and goes to step S116. In the time period between the times t2 and t3, the peak value 42 is kept equal to the detection value at the time t2 and is not updated (FIG. 3D).

As shown in FIG. 3C, after the time t3, the detection value becomes greater than the current setting of the peak value 42 (=the detection value at the time t2). The decision module 32 accordingly determines that the detection value is greater than the peak value 42 (step S102: Yes) and updates the setting of the peak value 42 recorded in the memory 40 to the detection value at that time (step S104). The decision module 32 subsequently determines whether the updated setting of the peak value 42 is greater than the first reference value (step S106). Since the updated setting of the peak value 42 is still smaller than the first reference value as shown in FIG. 3C, the decision module 32 goes to step S112. The decision module 32 determines whether the updated setting of the peak value 42 is greater than the second reference value (step S112). Since the updated setting of the peak value 42 is still smaller than the second reference value, the decision module 32 goes to step S116.

According to this sequence of processing, in response to reception of each detection value from the hydrogen detector 10, the decision module 32 compares the received detection value with the current setting of the peak value 42 and records a current maximum of the detection value as the setting of the peak value 42 into the memory 40. For example, in a time period between the time t3 and a time t4, the setting of the peak value 42 is updated every time the decision module 32 receives a detection value (FIG. 3D). The setting of the peak value 42 is not deleted but is kept (FIG. 3D) even in the event of the driver's OFF operation of the IG switch (FIG. 3A) to stop the operation of the fuel cell stack 210 at a time t5 shown in FIG. 3. On a restart of hydrogen detection by the hydrogen detector 10 at a time t6, the decision module 32 compares a newly received detection value with the setting of the peak value 42 recorded in the memory 40 (the maximum of the detection value in a time period between the time t1 and the time t5).

The setting of the peak value 42 is sequentially updated by repetition of this sequence of processing discussed above. During this time period, the diagnosis 1 flag 44 and the diagnosis 2 flag 46 are kept OFF. The decision module 32 newly receives a detection value at a time t7 and determines whether the newly received detection value is greater than the peak value 42 (step S102). Since the detection value is greater than the peak value 42 as shown in FIGS. 3C and 3D, the decision module 32 updates the setting of the peak value 42 recorded in the memory 40 to the detection value at the time t7 (step S104).

The decision module 32 subsequently determines whether the updated setting of the peak value 42 (=the detection value at the time t7) is greater than the first reference value (step S106). Since the updated setting of the peak value 42 is still smaller than the first reference value as shown in FIG. 3C, the decision module 32 goes to step S112. The decision module 32 determines whether the updated setting of the peak value 42 (=the detection value at the time t7) is greater than the second reference value (step S112). The updated setting of the peak value is greater than the second reference value, so that the decision module 32 changes the diagnosis 2 flag recorded in the memory 40 to the ON setting as shown in FIG. 3E (step S114).

In a time period between the time t7 and a time t8, when the checker connects the checking tool 300 to the input/output terminals 70 to issue an output request, the decision module 32 identifies that there is an output request (step S116: Yes). In response to the output request, the decision module 32 outputs the current settings of the diagnosis 2 flag and the peak value 42 to the checking tool 300 via the input/output port 50 (step S118). The checker is thus notified of the occurrence of a rather insignificant hydrogen leakage that is not a driver alarming level. Such notification allows the checker to take an adequate action against this rather insignificant hydrogen leakage, for example, replacement of relevant part of the fuel cell stack 210, based on the peak value 42.

The decision module 32 newly receives a detection value at the time t8 and determines whether the newly received detection value is greater than the peak value 42 (step S102). Since the detection value is greater than the peak value 42 as shown in FIGS. 3C and 3D, the decision module 32 updates the setting of the peak value 42 recorded in the memory 40 to the detection value at the time t8 (step S104). The decision module 32 subsequently determines whether the updated setting of the peak value 42 (=the detection value at the time t8) is greater than the first reference value (step S106). Since the updated setting of the peak value 42 is greater than the first reference value as shown in FIG. 3C, the decision module 32 changes the diagnosis 1 flag recorded in the memory 40 to the ON setting as shown in FIG. 3F (step S108) and sends a light-up command to the alarm lamp 60 (step S110). The alarm lamp 60 is then lit up to notify the driver of the occurrence of a hydrogen leakage.

The decision module 32 subsequently determines whether the updated setting of the peak value 42 (=the detection value at the time t8) is greater than the second reference value (step S112). Since the updated setting of the peak value 42 is greater than the second reference value as shown in FIG. 3C, the decision module 32 changes the diagnosis 2 flag recorded in the memory 40 to the ON setting as shown in FIG. 3F (step S114). The diagnosis 2 flag has already been changed to the ON setting at the time t7 and is thus kept ON at this moment (FIG. 3E). In this state, the peak value 42 set to the detection value at the time t8, the ON setting of the diagnosis 1 flag 44, and the ON setting of the diagnosis 2 flag 46 are recorded in the memory 40. When the checker subsequently connects the checking tool 300 to issue an output request, the decision module 32 outputs the current settings of the diagnosis 1 flag, the diagnosis 2 flag, and the peak value 42 to be displayed on the checking tool 300.

A4. Effects of Embodiment

The prior art hydrogen detection system detects the occurrence of only a significant hydrogen leakage from a fuel cell stack, which is a level of adversely affecting the normal operation of the fuel cell stack, and notifies the driver of the occurrence of a hydrogen leakage by, for example, lighting up an alarm lamp. A typical measure that may be taken against such a hydrogen leakage is replacement of the whole fuel cell stack with a new one. There is naturally a demand for being notified of a rather insignificant level of deterioration of the fuel cell stack that does not require replacement of the whole fuel cell stack but is sufficiently handled to eliminate a hydrogen leakage by replacement of only relevant part of the fuel cell stack. One available method for fulfilling this demand is setting a lower value to a reference value for lighting up the alarm lamp than a conventionally set value in the prior art hydrogen detection system. This method may, however, give an alarm to the driver or may stop the operation of the fuel cell stack, irrespective of the rather insignificant level of deterioration that has no substantive effect on the normal operation of the fuel cell stack. The alarm or the operation stop may unnecessarily make the driver feel uneasy or uncomfortable or may cause some inconvenience or trouble.

In the event of the occurrence of a rather insignificant hydrogen leakage from the fuel cell stack 210 (in the case where the detection value of the hydrogen detector 10 is greater than the second reference value but is smaller than the first reference value), on the other hand, the hydrogen detection system 100 of the embodiment does not light up the alarm lamp 60. The hydrogen detection system 100 simply records the setting of the peak value 42 at that time and changes the diagnosis 2 flag to the ON setting that represents the occurrence of a rather insignificant hydrogen leakage.

The arrangement of the embodiment does not specifically notify the driver of the occurrence of an insignificant hydrogen leakage from the fuel cell stack 210, thereby effectively preventing the driver from unnecessarily feeling uneasy or uncomfortable. The checker is allowed to use the checking tool 300 and check up the settings of the diagnosis 2 flag and the peak value 42 with a view to determining the level of deterioration of the fuel cell stack 210. An adequate action can thus be taken against a hydrogen leakage from the fuel cell stack 210 that is still a rather insignificant level of having no substantive effect on the normal operation of the fuel cell stack 210.

The arrangement of the embodiment enables the checker to readily detect deterioration of the fuel cell stack 210 without detaching the fuel cell stack 210 from the fuel cell vehicle, disassembling the fuel cell stack 210, and checking for any defect or flaw of sealing members. Namely the checker can estimate the level of deterioration of the fuel cell stack 210 based on the recorded setting of the peak value 42 and take an adequate action, for example, replacement of relevant part of the fuel cell stack 210 or replacement of the whole fuel cell stack 210. This arrangement of the embodiment relieves the labor and shortens the time required for checkup and maintenance of the fuel cell stack 210.

B. Other Aspects

The embodiment and its applications discussed above are to be considered in all aspects as illustrative and not restrictive. There may be many modifications, changes, and alterations without departing from the scope or spirit of the main characteristics of the present invention. Some examples of possible modification are given below.

(1) When the detection value of the hydrogen detector 10 exceeds the first reference value V1, the system of the embodiment discussed above lights up the alarm lamp 60 to notify the driver of the occurrence of a hydrogen leakage. The method of notification is, however, not restricted to the alarm lamp but may give an alarm message, such as 'Warning! Hydrogen Leakage', on a display installed in the fuel cell vehicle, may give an adequate voice alarm, or may give any combination of these alarms. Another method of notification may stop the operation of the fuel cell system 200.

(2) The above embodiment describes the fuel cell system 200 mounted on the vehicle. This configuration is, however, illustrative but not restrictive. The application of the invention to a stationary fuel cell system may have similar effects.

(3) The fuel cell system 200 of the embodiment has the hydrogen detection system 100, which includes the hydrogen detector 10 to detect the concentration of hydrogen. The gas as the object to be detected is, however, not limited to hydrogen. In a vehicle driven with, for example, a gasoline engine, a diesel engine, a hydrogen engine, or a natural gas engine and equipped with a gas detection system, a gas sensor corresponding to each fuel may be provided, in place of the hydrogen detector 10, to attain the similar effects to those of the embodiment discussed above. The gas sensor may be used to detect not only a fuel leakage from the engine but a fuel leakage from production equipment for manufacturing and accumulating the fuel.

(4) In the system of the embodiment discussed above, the decision module 32 records the maximum of the detection value (hydrogen concentration) into the memory. One possible modification may be a system structured to have no such a record of the maximum detection value. This modified system may also be designed to change the diagnosis 2 flag to the ON setting, when the detection value is greater than the second reference value but is smaller than the first reference value. The checker is allowed to use the checking tool 300 and check up the setting of the diagnosis 2 flag. This modified arrangement also notifies the checker of the occurrence of an insignificant hydrogen leakage from the fuel cell stack 210 and enables the checker to take an adequate action.

The invention claimed is:

1. A vehicle equipped with a fuel cell system comprising fuel cells and a gas detection system configured to detect hydrogen leaked from the fuel cells, the gas detection system comprising:
 a gas concentration detector constructed to detect a concentration of hydrogen leaked from the fuel cells;
 a recording assembly;
 a notification module; and
 a control device programmed to make a distinction between, on one hand, giving notice to an operator of the vehicle and stopping the operation of the fuel cell system, and, on the other hand, recording a result of the concentration of hydrogen leaked into the recording assembly that can be retrieved at a later time by a diagnostic checking tool, wherein the control device is programmed to render the distinction based on the concentration of hydrogen leaked from the fuel cells in the following manner:
 (a) when the hydrogen concentration detected by the gas concentration detector is higher than a preset first reference value, control the notification module to give notice to the operator of the vehicle and stop the operation of the fuel cell system, and
 (b) when the detected hydrogen concentration is (i) higher than a preset second reference value that is lower than the preset first reference value and (ii) is lower than the preset first reference value, not give notice to the operator of the vehicle via the notification module, but record the detection result into the recording assembly that can be retrieved at a later time by a diagnostic checking tool.

2. The vehicle in accordance with claim 1, wherein the notification module is provided on an instrumental panel.

3. The vehicle in accordance with claim 1, wherein the notification module is a warning lamp.

4. The vehicle in accordance with claim 1, wherein the notification module is a display displaying a warning.

* * * * *